(12) United States Patent
Olsson et al.

(10) Patent No.: US 11,057,767 B2
(45) Date of Patent: Jul. 6, 2021

(54) METHOD AND NODE FOR HANDLING ATTACHMENT OF A UE

(71) Applicant: Telefonaktiebolaget LM Ericsson (publ), Stockholm (SE)

(72) Inventors: Lasse Olsson, Träslövsläge (SE); Qian Chen, Mölndal (SE); Håkan Tranberg, Mölnlycke (SE); Hanbing Zhang, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 16/328,780

(22) PCT Filed: Oct. 11, 2016

(86) PCT No.: PCT/EP2016/074312
§ 371 (c)(1),
(2) Date: Feb. 27, 2019

(87) PCT Pub. No.: WO2018/068831
PCT Pub. Date: Apr. 19, 2018

(65) Prior Publication Data
US 2019/0230508 A1     Jul. 25, 2019

(51) Int. Cl.
*H04W 4/00*      (2018.01)
*H04W 12/06*     (2021.01)
(Continued)

(52) U.S. Cl.
CPC ......... *H04W 12/06* (2013.01); *H04L 63/0892* (2013.01); *H04W 4/90* (2018.02);
(Continued)

(58) Field of Classification Search
None
See application file for complete search history.

(56) References Cited

U.S. PATENT DOCUMENTS

2010/0323700 A1* 12/2010 Bachmann ............ H04W 36/14
455/436
2011/0299395 A1* 12/2011 Mariblanca Nieves ......
H04L 47/12
370/235

(Continued)

FOREIGN PATENT DOCUMENTS

EP       2 876 915 A1    5/2015
WO    WO 2015/166099 A1  11/2015

OTHER PUBLICATIONS

International Search Report and Written Opinion of the International Searching Authority, PCT/EP2016/074312, dated Nov. 23, 2016, 9 pages.

(Continued)

*Primary Examiner* — Elisabeth Benoit Magloire
(74) *Attorney, Agent, or Firm* — Sage Patent Group

(57) ABSTRACT

The embodiments herein relate to a method performed by a local subscriber node for handling attachment of a User Equipment (UE) to a central network. The local subscriber node comprises default subscription data which is common for all UEs which are associated with a local network. When a connection to a central subscriber node is accessible, the local subscriber node obtains authentication data associated with the default subscription data from the central subscriber node. When the UE requests attachment to the central network when the connection to the central subscriber node is inaccessible, the local subscriber node sends the obtained authentication data for the UE to a mobility management node.

23 Claims, 11 Drawing Sheets

(51) Int. Cl.

| | | |
|---|---|---|
| *H04W 4/90* | (2018.01) | |
| *H04W 8/30* | (2009.01) | |
| *H04L 29/06* | (2006.01) | |
| *H04W 8/04* | (2009.01) | |
| *H04W 8/08* | (2009.01) | |
| *H04W 24/08* | (2009.01) | |
| *H04W 60/00* | (2009.01) | |

(52) U.S. Cl.
CPC ............... *H04W 8/04* (2013.01); *H04W 8/08* (2013.01); *H04W 8/30* (2013.01); *H04W 24/08* (2013.01); *H04W 60/00* (2013.01)

(56) References Cited

U.S. PATENT DOCUMENTS

| | | | |
|---|---|---|---|
| 2012/0189016 A1* | 7/2012 | Bakker | H04W 76/11 370/401 |
| 2013/0166746 A1* | 6/2013 | Andreasen | H04L 41/5051 709/225 |
| 2015/0049643 A1* | 2/2015 | Sheth | H04L 63/0892 370/255 |
| 2015/0173111 A1 | 6/2015 | Agarwal et al. | |
| 2016/0044475 A1* | 2/2016 | Bain | H04M 3/42382 455/414.1 |
| 2016/0112896 A1* | 4/2016 | Karampatsis | H04W 28/0289 370/230.1 |
| 2016/0205550 A1 | 7/2016 | Rajadurai | |
| 2018/0109945 A1* | 4/2018 | Kweon | H04W 8/18 |

OTHER PUBLICATIONS

Foreign Reference, Document No. 10—WO2015/0166099A1 ("WO2015166099A1.pdf")—41 pages.
Foreign Reference, Document No. 11—EP 2 876 915 A1 ("EP2876915A1.pdf")—26 pages.
Non-Patent Literature, Document No. 13—3GPP TR 23.799 V1.02 (Sep. 2016) ("23799-102c1.pdf")—423 pages.
Non-Patent Literature, Document No. 14—3GPP TS 23.060 V13.7.0 (Jun. 2016) ("23060-d70.pdf")—362 pages.
Non-Patent Literature, Document No. 15—3GPP TS 23.401 V14.0.0 (Jun. 2016) ("23401-e00.pdf")—374 pages.
Appendix C—the Notice of Acceptance of Application Under 35 U.S.C. 371 and 37 CFR 1.495. The Information Disclosure Statement filed on Feb. 27, 2019 is listed as "received".
3GPP TS 23.060 V13.7.0 (Jun. 2016), 3$^{rd}$ Generation Partnership Project; Technical Specification Group Services and System Aspects; General Packet Radio Service (GPRS); Service Description; Stage 2 (Release 13), 362 Pages.
3GPP TS 23.401 V14.0.0 (Jun. 2016), 3rd Generation Partnership Project; Technical Specification Group Services and System Aspects; Technical Specification Group Services and System Aspects; General Packet Radio Service (GPRS) enhancements for Evolved Universal Terrestrial Radio Access Network (E-UTRAN) access (Release 14), 374 Pages.
3GPP TR 23.799 V1.0.2 (Sep. 2016), 3rd Generation Partnership Project; Technical Specification Group Services and System Aspects; Study on Architecture for Next Generation System (Release 14), 423 Pages.

* cited by examiner

METHOD AND NODE FOR HANDLING ATTACHMENT OF A UE

CROSS REFERENCE TO RELATED APPLICATIONS

This application is a 35 U.S.C. § 371 national stage application of PCT International Application No. PCT/EP2016/074312 filed on Oct. 11, 2016, the disclosure and content of which is incorporated by reference herein in its entirety.

TECHNICAL FIELD

Embodiments herein relate generally to a local subscriber node and a method performed by the local subscriber node. More particularly the embodiments herein relate to handling attachment of a User Equipment (UE) to a central network.

BACKGROUND

Today it is impossible for a UE to connect to any Mobile Network Operator (MNO) without a connection to a subscriber node such as e.g. a Home Location Register (HLR) or a Home Subscriber Server (HSS). The HLR and HSS are examples of subscriber nodes which comprises subscriber data. The terms subscriber information, subscriber data, subscription information and subscription information may be used interchangeably herein. This is specified in for example the Third Generation Partnership Project (3GPP) Technical Specification (TS) 23.060 V13.7.0 (2016-06) and 3GPP TS 23.401 V14.0.0 (2016-06) during the authentication/security step, Evolved Packet System Authentication and Key Agreement (EPS-AKA) and the Update Location procedure in the Attach procedure. FIG. 1a and FIG. 1b illustrates an example of an attach procedure, i.e. E-UTRAN Initial attach, which corresponds to FIG. 5.3.2.1-1 from 3GPP TS 23.401 (2016-06). FIG. 1a comprises steps 101-121 and FIG. 1b comprises steps 122-141. FIG. 1b is a continuation of FIG. 1a, i.e. steps 101-121 are performed first, and then steps 122-141 in FIG. 1b are performed. The authentication/security step mentioned above is illustrated in step 107 in FIG. 1a and the Update Location procedure is illustrated with steps 115-121 in FIG. 1a. The continuous arrows in FIGS. 1a and 1b illustrate compulsory steps and the dotted arrows in FIG. 1 indicate optional or conditional steps.

All steps in FIGS. 1a and 1b will not be described in detail herein for the sake of simplicity. As seen in FIGS. 1a and 1b, a UE 205 needs to register with the network to receive services that require registration. This registration is described as Network Attachment. The always-on Internet Protocol (IP) connectivity for UEs 205 of the EPS is enabled by establishing a default EPS bearer during the network attachment. The Policy and Charging Control (PCC) rules applied to the default EPS bearer may be predefined in the Packet Data Network Gateway (PDN GW, PGW) 220 and activated in the attachment by the PDN GW itself. The attach procedure may trigger one or multiple Dedicated Bearer Establishment procedures to establish dedicated EPS bearer(s) for that UE 205. During the attach procedure, the UE 205 may request for an IP address allocation.

During the Initial Attach procedure the Mobile Equipment (ME) Identity is obtained from the UE 205. The Mobility Management Entity (MME) 203 operator may check the ME Identity with an Equipment Identity Register (EIR) 223. The MME 203 passes the ME Identity (International Mobile Station Equipment Identity and Software Version Number (IMEISV)) to the HSS 210 and to the PDN GW 220.

During the Initial Attach procedure, if the MME 203 supports Single Radio Voice Call Continuity (SRVCC) and if any of the conditions in step 115 in FIG. 1a are satisfied, the MME 203 informs the HSS 210 with the UE Single Radio Voice Call Continuity (SRVCC) capability e.g. for further IP Multimedia Subsystem (IMS) registration.

The method illustrated in FIGS. 1a and 1b comprises at least some of the following steps, which steps may be performed in any suitable order than described below:

Step 101-106

These steps are illustrated in FIG. 1a. Steps 101-106 involves an attach request from a UE 205 to the eNB 206, identification request and response and identity request and response.

Step 107

This step is illustrated in FIG. 1a. In step 107 illustrated in FIG. 1a, authentication and security procedures are performed which involves the UE 205, the new MME 203 and the HSS 210. If no UE context for the UE 205 exists anywhere in the network, if the Attach Request (sent in step 101) was not integrity protected, or if the check of the integrity failed, then the authentication and Non Access Stratum (NAS) security setup to activate integrity protection and NAS ciphering are mandatory. Otherwise it is optional. If a NAS security algorithm is to be changed, then the NAS security setup is performed in this step 107.

If the MME 203 is configured to support Emergency Attach for unauthenticated International Mobile Subscriber Identities (IMSI) and the UE 205 indicated Attach Type "Emergency" the MME 203 skips the authentication and security setup or the MME 203 accepts that the authentication may fail and continues the attach procedure.

After step 107, all NAS messages shall be protected by the NAS security functions (integrity and ciphering) indicated by the MME 203 unless the UE 205 is emergency attached and not successfully authenticated.

As mentioned earlier, a UE 205 cannot connect to any MNO without a connection to a subscriber node such as e.g. a HSS 210. In this step 107, it is illustrated that the authentication/security involves a connection between the UE 205 and the HSS 210 (also involving the new MME 203).

The authentication is based on subscriber data. When the connection between the MME 203 and the HSS 210 is broken, it is not possible for a UE 205 to be authenticated since the subscriber data is not accessible by the MME 203.

Steps 108-114

These steps are illustrated in FIG. 1a. Step 108-114 involves Identity Request/Response, ME Identity Check, Ciphered Options Request and Response, Delete Session Request and Response and Policy and Charging Enforcement Function (PCEF) Initiated Internet Protocol-Connectivity Access Network (IP-CAN) Session Termination.

Step 115

This step is illustrated in FIG. 1a. The new MME 203 may send an Update Location Request message to the HSS 210. The Update Location Request message may comprise one or more parameters such as for example MME Identity, IMSI, ME Identity (e.g. IMEISV), MME Capabilities, Uniform Resource Locator (ULR) Flags, Homogeneous Support of IMS Voice over Packet Switched (PS) Sessions, UE SRVCC capability, equivalent Public Land Mobile Network (PLMN) list etc. The MME capabilities indicate the MME's 203 support for regional access restrictions functionality. ULR-Flags indicates "Initial-Attach-Indicator" as this is an Attach procedure. The inclusion of the equivalent PLMN list indicates that the MME 203 supports the inter-PLMN handover to a CSG cell in an equivalent PLMN using the subscription information of the target PLMN. The "Homogenous Support of IMS Voice over PS Sessions" indication shall not be included unless the MME has completed its evaluation of the support of "IMS Voice over PS Session".

For an Emergency Attach in which the UE 205 was not successfully authenticated, the MME 203 does not send an Update Location Request to the HSS 210.

As mentioned earlier, a UE 205 cannot connect to any MNO without a connection to a subscriber node such as e.g. a HSS 210. In this step 115, it is illustrated that the update location request involves a connection between the new MME 203 and the HSS 210.

Steps 116-117

These steps are illustrated in FIG. 1a. The HSS 210 sends a Cancel Location message to the old MME 203 (step 116). The Cancel Location message comprises parameters such as e.g. IMSI, Cancellation Type etc. The old MME 203 acknowledges by sending a Cancel Location Acknowledgement (Ack) message (step 117) to the old MME/SGSN 203. SGSN is short for Serving GPRS Support Node, where GPRS is short for General Packet Radio Services, The Cancel Location Ack message comprises the IMSI. The Old MME 203 removes the MM and bearer contexts. If the ULR-Flags indicate the "Initial-Attach-Indicator" and the HSS 210 has the SGSN registration, then the HSS 210 sends the Cancel Location message (step 116) to the old SGSN 203 (instead of the old MME 203). The cancel Location message sent to the old SGSN comprises the IMSI, Cancellation Type. The Cancellation Type indicates the old MME/SGSN 203 to release the old Serving Gateway (SGW) 225 resource.

Steps 118-120

These steps are illustrated in FIG. 1a. If there are active bearer contexts in the old MME/SGSN 203 for this particular UE 205, the old MME/SGSN 203 deletes these bearer contexts by sending a Delete Session Request message to the PGW 220 (step 118). The Delete Session Request message comprises a Linked EPS Bearer Identity (LBI). The PGW 220 returns a Delete Session Response message to the old MME/SGSN 203 (step 120). The Delete Session Response message comprises a Cause parameter. If a Policy and Charging Rules Function (PCRF) 228 is deployed, the PGW 220 employs an IP CAN Session Termination to indicate that resources have been released (step 119).

Step 121

This step is illustrated in FIG. 1a. The HSS 210 acknowledges the Update Location message by sending an Update Location Ack message to the new MME 203. The Update Location message comprises IMSI and Subscription data. The Subscription Data comprises one or more PDN subscription contexts. Each PDN subscription context contains an 'EPS subscribed QoS profile' and the subscribed APN-AMBR and the WLAN offloadability indication. The new MME 203 validates the UE's 205 presence in the (new) Tracking Area (TA). If due to regional subscription restrictions or access restrictions (e.g. CSG restrictions) the UE 205 is not allowed to attach in the TA or due to subscription checking fails for other reasons, the new MME 203 rejects the Attach Request with an appropriate cause. If all checks are successful then the new MME 203 constructs a context for the UE 205. If the APN provided by the UE 205 is not allowed by subscription, or the Update Location is rejected by the HSS 210, the new MME 203 rejects the Attach Request from the UE 205 with an appropriate cause.

For an Emergency Attach the MME 203 does not check for access restrictions, regional restrictions or subscription restrictions. For an Emergency Attach, the MME 203 shall ignore any unsuccessful Update Location Response from HSS 210 and continue with the Attach procedure.

Step 122-141

These steps are illustrated in FIG. 1b. Steps 122-141 involves Create Session Request and Response, PCEF Initiated IP-CAN Session Establishment/Modification, First Downlink Data, Initial Context Setup Request/Attach Accept, RRC Connection Reconfiguration and RRC Connection Reconfiguration Complete, Initial Context Setup Response, Direct Transfer, Attach Complete, First Uplink Data, Modify Bearer Request and Modify Bearer Response, Notify Request and Notify Response.

As described above, it is not possible for the UE 205 to gain access to any services (apart from emergency) without a connected HSS 210. This means that, in case of loss of satellite connectivity only local services are available to the UE 205, only intra-village services. The UE 205 has no access to e.g. the Internet. Local UEs 205 may require authentication with the HSS 210 if:

The UE performs a TAU procedure.

A Selective Authentication parameter triggers a UE 205 to authenticate.

A GUTI relocation timer expires and the MME 203 allocates a new GUTI for the UE 205.

The UE 205 performs an Attach procedure.

A roaming UE 205 tries to register in the local network.

SUMMARY

An objective of embodiments herein is therefore to obviate at least one of the above disadvantages and to provide improved connectivity for a UE.

According to a first aspect, the objective is achieved by a method performed by a local subscriber node for handling attachment of a UE to a central network. The local subscriber node comprises default subscription data which is common for all UEs which is associated with a local network. When a connection to a central subscriber node is accessible, the local subscriber node obtains authentication data associated with the default subscription data from the central subscriber node. When a UE requests attachment to a central network when the connection to the central subscriber node is inaccessible, the local subscriber node sends the obtained authentication data for the UE to a mobility management node.

According to a second aspect, the objective is achieved by a local subscriber node for handling attachment of a UE to a central network. The local subscriber node comprises default subscription data which is common for all UEs which is associated with a local network. The local subscriber node is adapted to, when a connection to a central subscriber node is accessible, obtain authentication data associated with the default subscription data from the central subscriber node. The local subscriber node is further adapted to, when a UE requests attachment to a central network when the connection to the central subscriber node is inaccessible, send the obtained authentication data for the UE to a mobility management node.

Since the local subscriber node can provide authentication data to the mobility management node based on the default subscription data when the connection to the central network is inaccessible, a UE can still be provided local connectivity.

Embodiments herein afford many advantages, of which a non-exhaustive list of examples follows:

An advantage of the embodiments herein is that they provide local connectivity even if the backbone connection is broken, i.e. if the connection to the central network is inaccessible.

Another advantage of the embodiments herein is that 100% of the local UEs will be covered. Roaming UEs that have once been connected to the local network will be covered. The only UEs that cannot connect are roaming UEs that tries to get connectivity the very first time in the local network (unless Extensible Authentication Protocol-Authentication and Key Agreement (EAP-AKA') is used).

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1A:
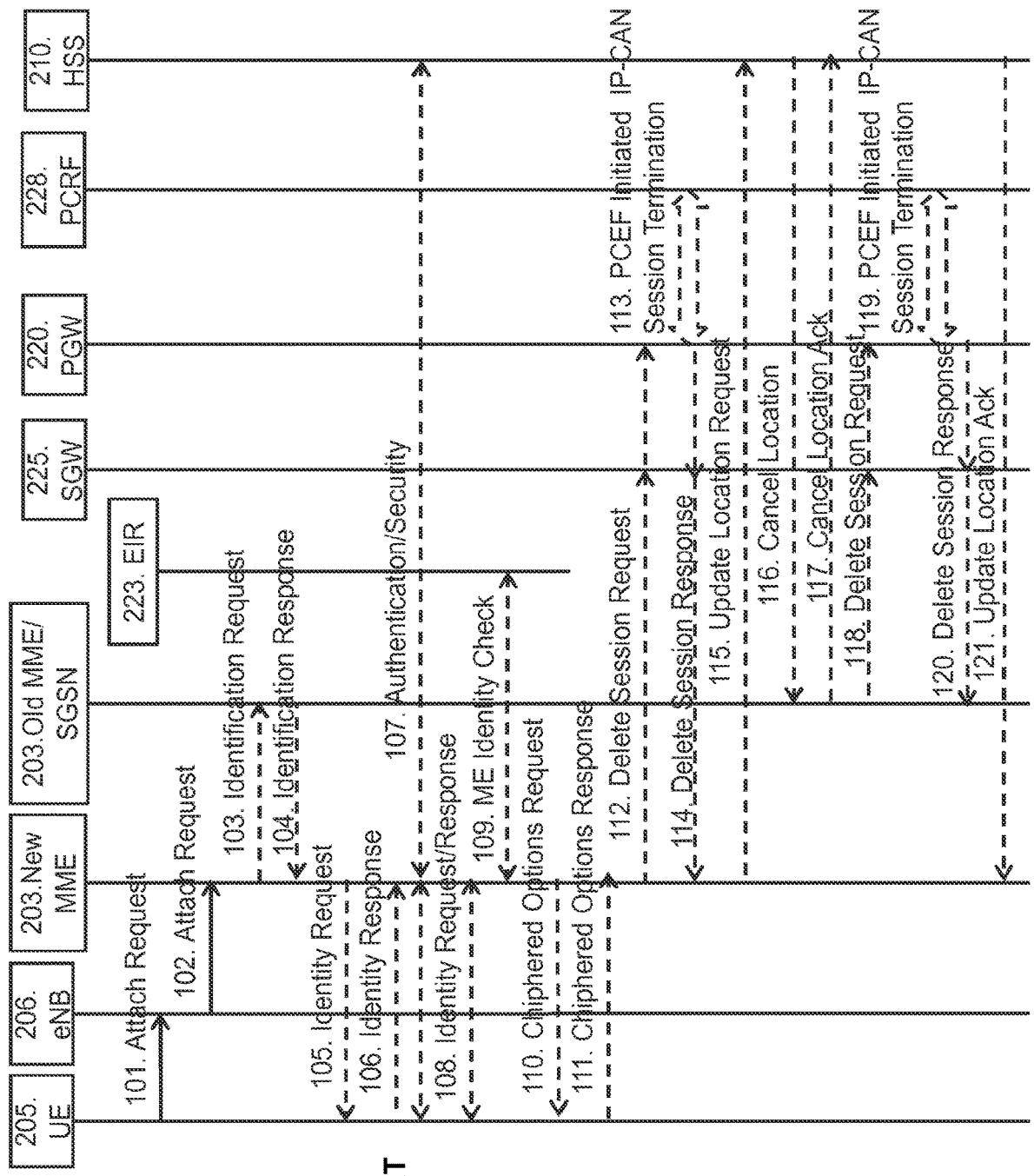
FIGS. 1a and 1b are signaling diagrams illustrating an attach procedure
Figure 1B:
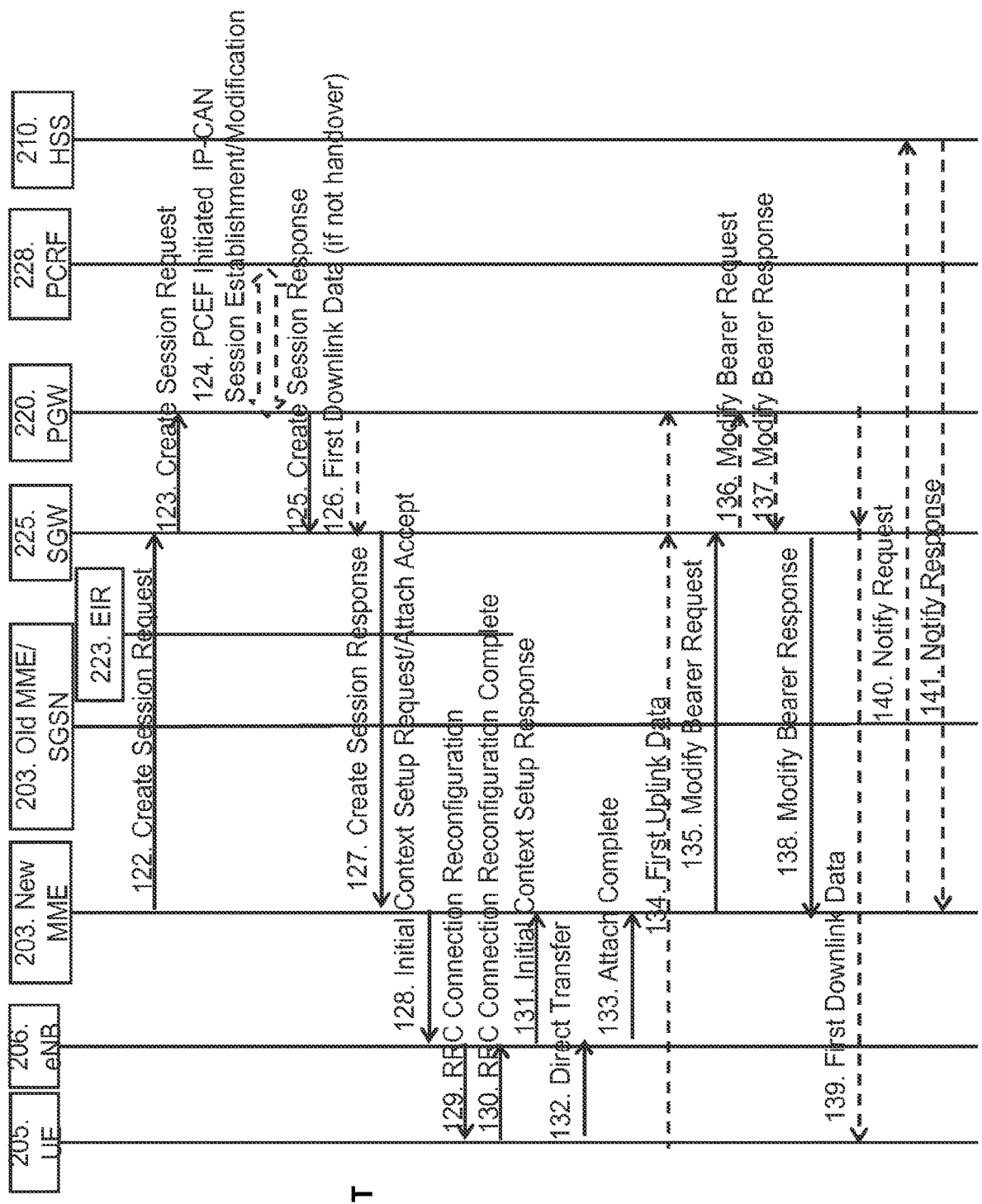
Figure 2:
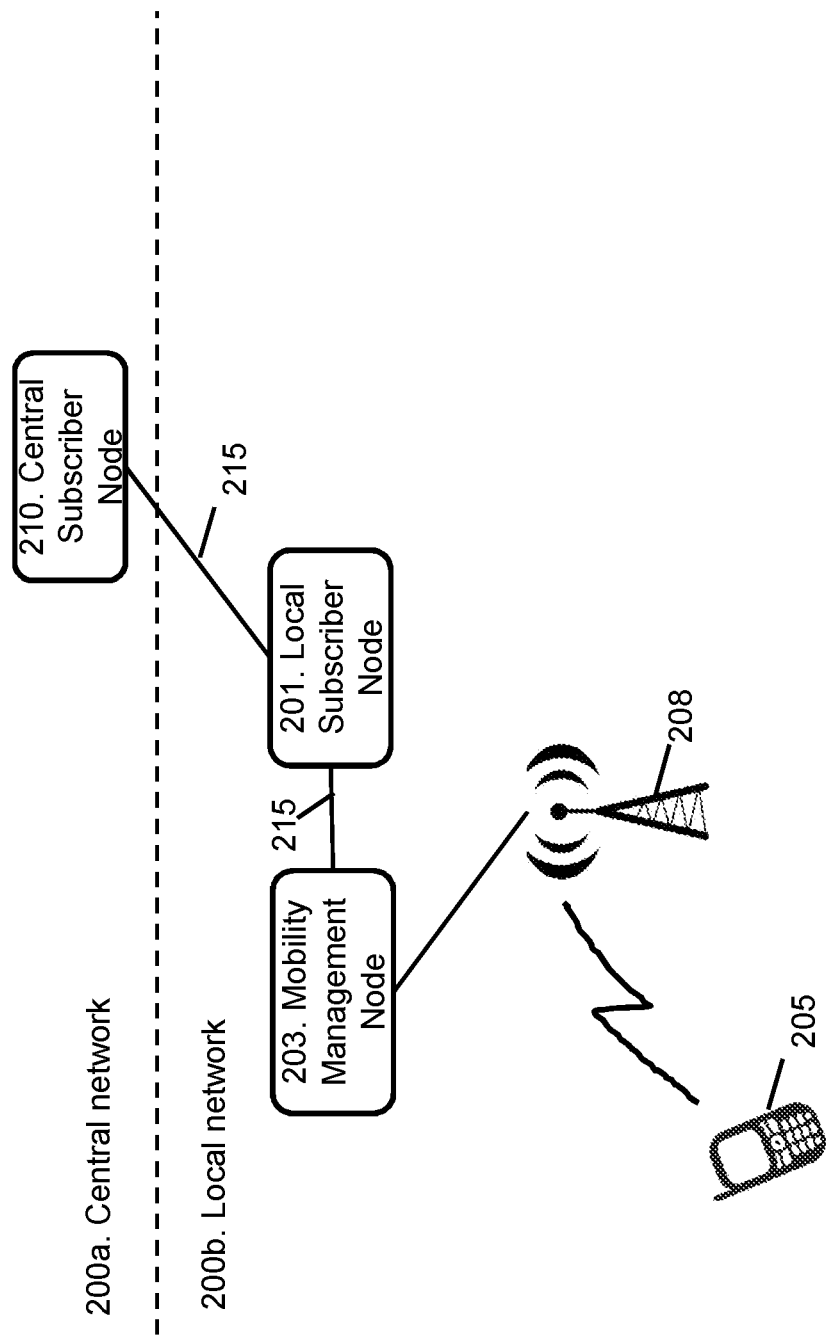
FIG. 2 is a schematic block diagram illustrating embodiments of a system.

FIG. 2 depicts a communications system in which embodiments herein may be implemented. The communications network may in some embodiments apply to one or more radio access technologies such as for example Second Generation (2G), Third Generation (3G), Fourth Generation (4G), Fifth Generation (5g), or any other Third Generation Partnership Project (3GPP) radio access technology, or other radio access technologies such as e.g. Wireless Local Area Network (WLAN).

FIG. 2 illustrates a central network 200a and a local network 200b. The central network 200a may be described as a macro EPS system providing national coverage while local network is a subset of the central network (e.g. rural deployment) that can function standalone with the embodiments herein. The local network 200b has a smaller size than the central network 200a, and the central network may comprise one or more local networks 200b. The local network 200b may be a small geographical area, a limited geographical area. Examples of a local network 200b may be a residence network, a school network, a laboratory network, a university campus network or an office building network. A local network 200b may be described as a Local Area Network (LAN).

The local network 200b may comprise a local subscriber node 201 connected to a mobility management node 203. The local subscriber node 201 may be a local HSS, a local HLR, a local VLR etc. The local subscriber node 201 may also be referred to as a proxy subscriber node, a proxy HSS, a proxy, HLR, a proxy VLR etc.

The local subscriber node 201 comprises default subscriber data which is common for all UEs 205 which are associated with the local network 200b, i.e. UEs 210 which are subscribers or residents of the local network 200b.

The UE 205 may be a UE by which a subscriber may access services offered by an operator's network and services outside operator's network to which the operators radio access network and core network provide access, e.g. access to the Internet. The UE 205 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 205 may be portable, pocket storable, hand held, computer comprised, or vehicle mounted devices, enabled to communicate voice and/or data, via the radio access network, with another entity, such as another device or a server.

The mobility management node 203 may be for example a MME, a SGSN, a combined MME and SGSN node etc. The mobility management node 203 is responsible for authorization and authentication of a UE 205, it manages mobility and roaming, tracking area management etc. The mobility management node 203 is connected to a Radio Access Network (RAN) node 208. The RAN node 208 serves the UE 205 when the UE 205 is located in the local network 200b. The RAN node 208 may be Radio Base Station (RBS), which sometimes may be referred to as e.g. evolved Node B (eNB, eNodeB, NodeB, B node, or Base Transceiver Station (BTS), New Radio (NR) depending on the technology and terminology used.

The central network 200a may comprise nodes such as for example a central subscriber node 210. The central subscriber node 210 may be a central HSS, a central HLR, a central VLR etc.

A connection 215 connects the mobility management node 203 to the central subscriber node 210, via the local subscriber node 210. Thus, the local subscriber node 201 may be described as being located between the mobility management node 203 and the central subscriber node 210. The connection 215 may be referred to as an S6a connection or interface. The connection 215 may be described as providing the UE 205 with connectivity to the central network 200a. The connection 215 may be accessible or inaccessible. When the connection 215 is accessible, the UE 205 may be provided with services from the central network 200a. When the connection 215 is inaccessible, the UE 205 has only access to services from the local network 200b. This will be described in more detail later.

Other central network nodes may be gateways (e.g. PGW, SGW), SGSN/MME, Online Charging System (OCS) etc. The central subscriber node 203 may be a central HSS, a central HLR, a central VLR, or any suitable central subscriber node. The central subscriber node 210 comprises subscriber data associated with each UE subscriber that is authorized to use services provided by the central network 200a. Examples of the subscriber data may be e.g. IMSI and MSISDN of the UE 205. The central subscriber node 210 comprises location information for the subscribers.

The nodes exemplified in FIG. 2 may be physical nodes or they may be implemented as functions. For example, the mobility management node may be a physical mobility management node or implemented as a mobility management node function. This implies with the next generation core network architecture defined in e.g. 3GPP TR 23.799, V0.7.0, where the core network does not comprise nodes anymore. The block diagram illustrated in e.g. FIG. 2 is therefore only an example, and the nodes may instead by replaced by function.

It should be noted that the communication links in the communications system illustrated in FIG. 2 may be of any suitable kind including either a wired or wireless link. The link may use any suitable protocol depending on type and level of layer (e.g. as indicated by the Open Systems Interconnection (OSI) model) as understood by the person skilled in the art.

Figure 3:
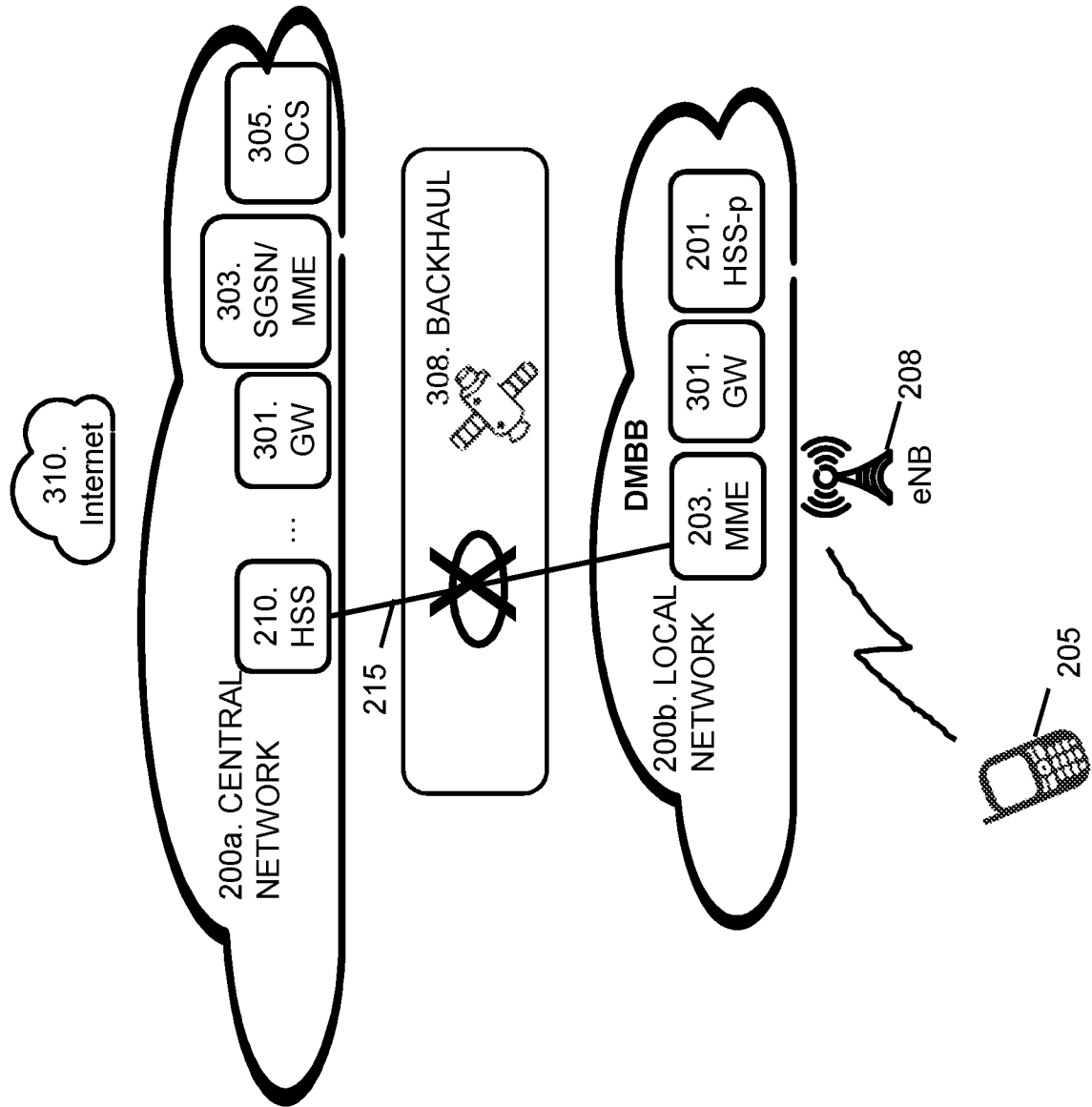
FIG. 3 is a schematic block diagram illustrating embodiments of a system.

FIG. 3 is a schematic block diagram illustrating a more detailed example of the communications system. FIG. 3 illustrates the central network 200a and the local network 200b. The central subscriber node 210 is exemplified by a HSS 210 in FIG. 3. Furthermore, the central network 200a comprises a Gateway (GW) 301, a SGSN/MME 303 and an OCS 305. The GW 301 may be for example a SGW or a PGW. In FIG. 3, the local network is exemplified with a Distributed Mobile Broadband (DMBB).

The mobility management node 203 in the local network 200b is exemplified with a MME 203 in FIG. 3. The local network 200b exemplified in FIG. 3 also comprises a GW 301. The local subscriber node 201 is exemplified with a HSS-proxy (HSS-p) 201 in FIG. 3.

The RAN node 208 is exemplified with an eNB 208 in FIG. 3.

FIG. 3 also illustrates a backhaul network 308. The backhaul network 308 distributes data from e.g. the Internet 310 to the UEs 205. The backhaul network 308 may comprise a communication satellite as illustrated in FIG. 3.

The method for handling attachment of a UE 205 to a central network 200a according to some embodiments will now be described with reference to the signaling diagram depicted in FIG. 4. Step 400 is performed both when the connection 215 is accessible and inaccessible. Steps 401-402 are executed when the connection 215 is accessible, i.e. when the connection 215 is intact and not broken. Steps 403-407 are executed when the connection 215 is inaccessible, i.e. when the connection 215 is broken. Steps 408-415 are executed when the connection 215 has become accessible again after having been inaccessible.

The local subscriber node 201 comprises default subscription data which is common for all UEs 210 which are associated with a local network 200b. In other words, all UEs have the same common default subscription data and there is no unique subscription data for each individual UE 210. An UE 210 that is associated with a local network 200b is a UE that is a subscriber or resident of the local network 200b, i.e. the local network 200b is the UEs home network.

The default subscription data may be preconfigured in the local subscriber node 201 or it may be obtained from the central subscriber node 210.

The method comprises the following steps, which steps may as well be carried out in another suitable order than described below.

Step 400

This step is performed both when the connection 215 is accessible and inaccessible. It is a step which may be continuously performed during the whole method illustrated in FIG. 4 or it may be performed at regular intervals. The local subscriber node 201 monitors the status of the connection 215 towards central subscriber node 210 in order to detect whether the connection 215 is accessible or inaccessible. The monitoring may be performed periodically or continuously.

Step 401

This step is performed when the connection 215 is accessible. When the monitoring in step 400 indicates that the connection is accessible, the local subscriber node 201 sends a request for authentication data to the central subscriber node 210. The request is sent in a request message. The request comprises the default subscriber data. The central subscriber node 210 receives the request from the local subscriber node 201. Upon reception of the request, the central subscriber node 210 may contact e.g. an Authentication Center (AuC) to obtain the authentication data.

Step 402

This step is performed when the connection 215 is accessible. The central subscriber node 210 comprises authentication data. Based on the received default subscriber data, the central subscriber node 210 finds the associated authentication data and sends the authentication data back to the requesting local subscriber node 201. Thus, the local subscriber node 201 comprises authentication data for the default subscriber data. The local subscriber node 201 receives the authentication data from the central subscriber node 210.

Step 403

This step is performed when the connection 215 is inaccessible, e.g. that it is broken. The UE 205 sends a request for attachment to the mobility management node 203. The mobility management node 203 receives the request from the UE 205 (possibly via other nodes). The request may be send in a request message, and the request may be sent via other nodes before reaching the mobility management node 203, e.g. via the RAN node 208. The request may comprise an UE identity, e.g. the IMSI.

Step 404

This step is performed when the connection 215 is inaccessible. When the mobility management node 203 receives the request for attachment of the UE 205, it determines that it needs to authenticate the UE 205 and therefore sends a request for authentication data to the local subscriber node 201. The request may comprise the UE identity from step 403. The local subscriber node 201 receives the request from the mobility management node 203.

Step 405

This step is performed when the connection 215 is inaccessible. From step 402, the local subscriber node 201 comprises authentication data which is associated with the default subscriber data. As a response to the request in step 404, the local subscriber node 201 sends the authentication data from step 402 to the mobility management node 203. The mobility management node 203 receives the authentication data from the local subscriber node 201. Thus, the mobility management node can obtain authentication data for the UE 205 even when the connection 215 is inaccessible.

Step 406

This step is performed when the connection 215 is inaccessible. Based on the authentication data, the mobility management node 203 authenticates the UE 205, and the UE 205 authenticates the network. In other words, the UE 205 and the local network 200b represented by the mobility management node 203 mutually checks and confirms that the other is valid. Upon successful authentication, the UE 205 is authorized to access the local network 200b (while the connection 215 is inaccessible). Thus, the UE 205 has access to services provided by the local network 200b while the central network is inaccessible.

Step 407

This step is performed when the connection 215 is inaccessible. The mobility management node 203 sends an attach accept message to the UE 205. The UE 205 receives the attach accept message from the mobility management node 203. The message may be sent via other nodes in the local network 200b before reaching the UE 205 such as e.g. the RAN node 208. The attach accept message indicates to the UE 205 that its request from step 403 has been accepted.

Step 408

This step is performed when the connection 215 has been become accessible again after having been inaccessible. The central subscriber node 210 sends subscriber data to the local subscriber node 201 when the connection 215 has become accessible again. The subscriber data sent from the central subscriber node 210 may be referred to as unique subscriber data or dedicated subscriber data, and is different from the default subscriber data in that it is unique or dedicated to a certain UE 205 (contrary to the default subscriber data which is common for all UEs 205). In other words, each UE 205 has a unique subscriber data. The local subscriber node 201 receives the unique subscriber data from the central subscriber node 210. The central subscriber node 210 may send this data on a regular basis to the local subscriber node 201, or upon request from the local subscriber node 201.

Step 409

This step is performed when the connection 215 has been become accessible again after having been inaccessible. The local subscriber node 201 determines to use the unique subscriber data received in step 408 instead of the default subscriber data which was used when the connection 215 was inaccessible. This may also be described as the local subscriber node 201 replaces the default subscriber data with the unique subscriber data. Thus, the local subscriber node 201 comprises updated subscriber data in the sense that the default subscriber data is updated by replacement of the unique subscriber data.

The local subscriber node 201 may override or replace the default subscriber data with the unique subscriber data, the local subscriber node 201 may delete the default subscriber data and only store the unique subscriber data, or the local subscriber node 201 may keep both the default subscriber data and the unique subscriber data, but only use the unique subscriber data when the connection 215 is accessible.

Step 410

This step is performed when the connection 215 has been become accessible again after having been inaccessible. When the connection 215 to the central subscriber node 210 becomes accessible after having been inaccessible, the local subscriber node 201 informs the central subscriber node 210 about the authentication of the UE 205 which has been performed while the connection 215 was inaccessible. This is when the unique subscription data is pulled from the central subscriber node 210 to the local subscriber node 201. Step 410 may also result in a HSS modification procedure. The central subscriber node 210 receives the information from the local subscriber node 210. This information may be in the form of a flag.

Step 411

This step is performed when the connection 215 has been become accessible again after having been inaccessible. The UE 205 sends a request for attachment to the mobility management node 203 (possibly via other nodes in the local network 200b). The mobility management node 203 receives the request form the UE 205, e.g. via the RAN node 208. The request may comprise an UE identity, e.g. the IMSI.

Step 412

This step is performed when the connection 215 has been become accessible again after having been inaccessible. When the mobility management node 203 receives the request for attachment of the UE 205, it determines that it needs to authenticate the UE 205 and therefore sends a request for authentication data to the local subscriber node 201. The request may comprise the UE identity from step 411. The local subscriber node 201 receives the request from the mobility management node 203.

Step 413

This step is performed when the connection 215 has been become accessible again after having been inaccessible. The central subscriber data comprises unique subscriber data and unique authentication data for each UE 205. So, based on the UD identity in the request from step 412, the central subscriber node 210 obtains authentication data which is unique for the requesting UE 205 and sends this unique authentication data to the mobility management node 203. The mobility management node 203 receives the unique authentication data from the central subscriber node 210.

Step 414

This step is performed when the connection 215 has been become accessible again after having been inaccessible. Based on the authentication data, the mobility management node 203 authenticates the UE 205, and the UE 205 authenticates the central network 200a. In other words, the UE 205 and the central network 200a represented by the mobility management node 203 mutually checks and confirms that the other is valid. Upon successful authentication, the UE 205 is authorized to access the central network 200a and the services provided by the central network 200a.

Step 415

This step is performed when the connection 215 has been become accessible again after having been inaccessible. The mobility management node 203 sends an attach accept message to the UE 205. The UE 205 receives the attach accept message from the mobility management node 203. The message may be sent via other nodes in the local network 200b before reaching the UE 205 such as e.g. the RAN node 208. The attach accept message indicates to the UE 205 that its request from step 411 has been accepted.

Figures 5A, 5B:
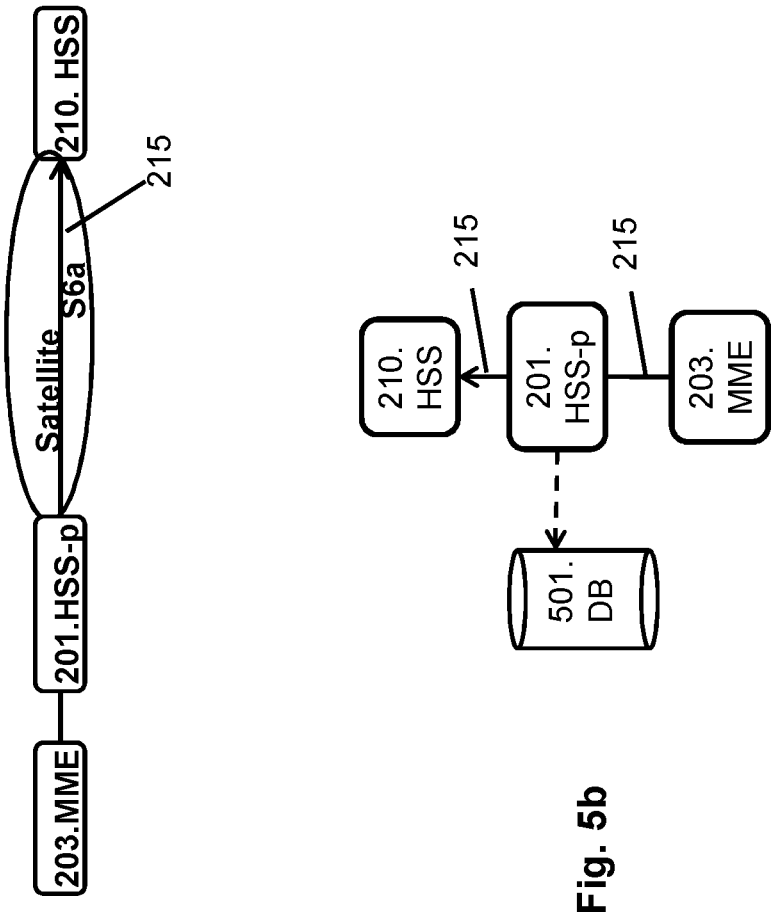
FIGS. 5a and 5b are schematic block diagrams illustrating embodiments of a system.

FIG. 5a and FIG. 5b illustrates examples of some of the nodes involved in the embodiments herein. FIG. 5a illustrates the mobility management node 203 (represented by the MME 203) which is connected to the local subscriber node 201 (represented by the HSS-p 201). FIG. 5a further illustrates that the local subscriber node 201 is connected to the central subscriber node 210 (represented by the HSS 210), and that this connection 215 may be an S6a connection. The S6a connection 215 may be a satellite connection.

FIG. 5*b* illustrates the MME 203, the HSS-p 201 and the HSS 210. FIG. 5*b* further illustrates that the local subscriber node 201 (represented by the HSS-p 201 in FIG. 5*b*) may be connected to a database (DB) 501. The DB 501 may store e.g. the default subscriber data, the authentication data etc. The DB 501 may be co-located with the local subscriber node 201 or it may be a standalone external DB 501 from which the local subscriber node 201 can obtain data and to which the local subscriber node 201 can send data for storage.

The local subscriber node 201 may potentially be added into the mobility management node 203, i.e. these two nodes may be co-located. The local subscriber node 201 will pre-fetch authentication vectors for defined UEs 205 while the connection 215 is accessible. The UEs 205 may be defined by the owner of the local subscriber node 201, through e.g. an O&M method. The mobility management node 203 will always try the connection 215 (e.g. S6a) initially. If the connection 215 fails (if it is inaccessible), the local data in the local subscriber node 201 will be used. The local subscriber node 201 will act as a snooping mechanism during the S6a communication. A snooping mechanism is a detection performed in secret. If the connection 215 fails (i.e. if it is inaccessible), the local subscriber node 201 will have a local default subscriber profile. The local subscriber node 201 may on a regular basis contact the central subscriber node 210 to retrieve "real" user data. If or when the LTE-U gets attraction in the market (and supported in the UE 205), EAP-AKA' may be used as a temporary substitute for EPS-AKA. LTE-U is an LTE based technology. The attach procedure in LTE-U is the same as the one in LTE. The different is that EPS-AKA is not used in LTE-U. Instead EAP-AKA' is one of the authentication methods.

When the UE 205 announces its presence in the local network 200*b*, the pre-fetched authentication data is used when the connection 215 is inaccessible (e.g. when the S6a connection is down). Authentication data provided from the central subscriber node 210 may be appended at the end of a list of existing authentication vectors already stored in the local subscriber node 201. The authentication data, e.g. in the form of vectors, may be appended at the end of the list so that the sequence number in the authentication vectors are coordinated as best as possible, always consume the oldest vectors first.

The mobility management node 203 may use authentication data downloaded from the central subscriber node 210. For example, download maximum 5 vectors per UE 203. The local default subscription data comprised in the local subscriber node 201 is used when the connection 215 is down. Otherwise (i.e. when the connection 215 is accessible), the UE unique subscription data is updated in the local subscriber node 210 and used for authentication. Another solution may be to trigger an EAP-AKA' procedure if the UE 203 has support for that procedure.

For roaming UEs 205 (i.e. non-local UEs 205) attach to the local network 200*b*, the mobility management node 203 may request authentication data from the central subscriber node 210 (not in the Visitor Location Register (VLR)). There are no existing non-authentication options apart from the EAP-AKA'.

Figure 4:
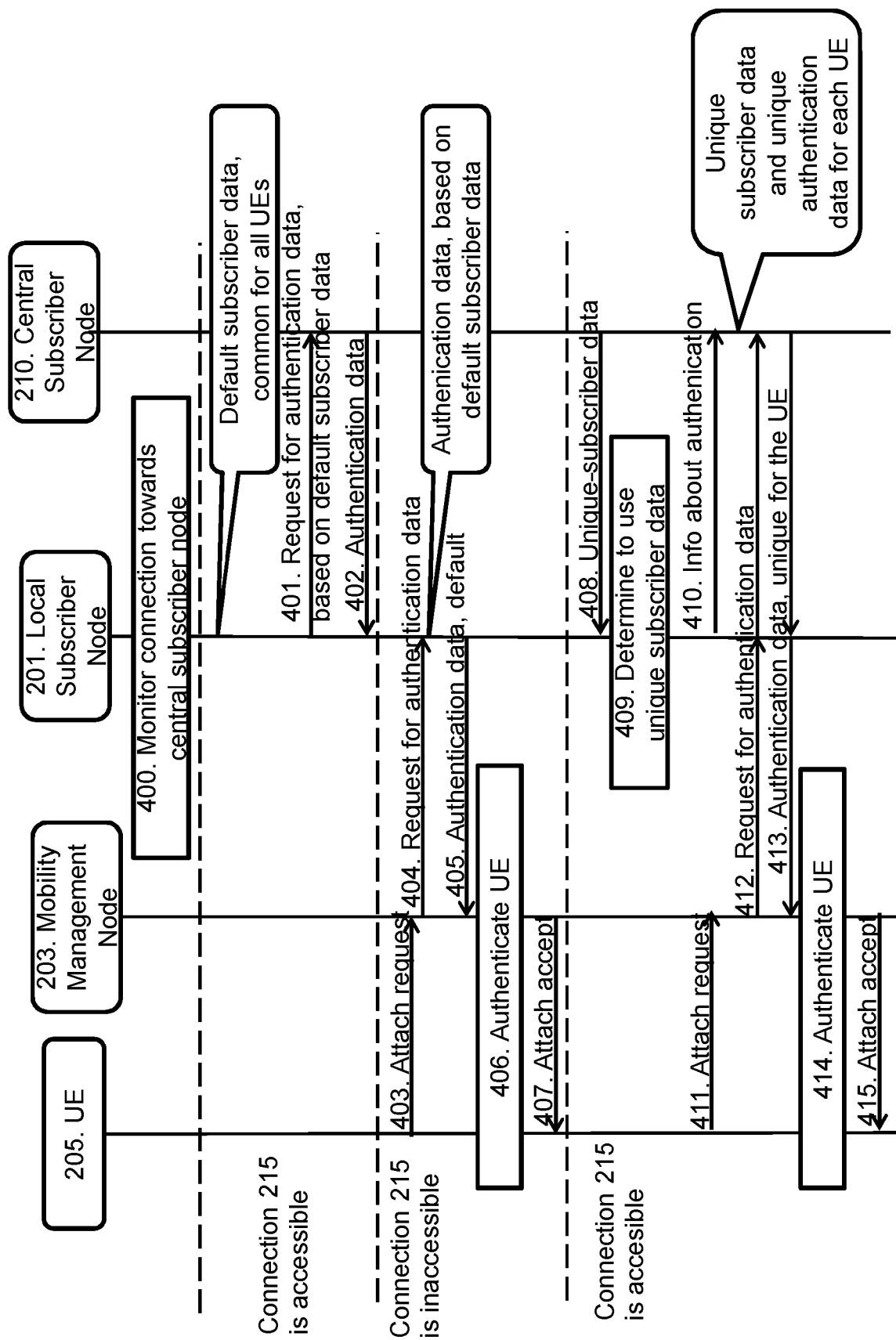
FIG. 4 is a signaling diagram illustrating embodiments of a method.
Figure 6:
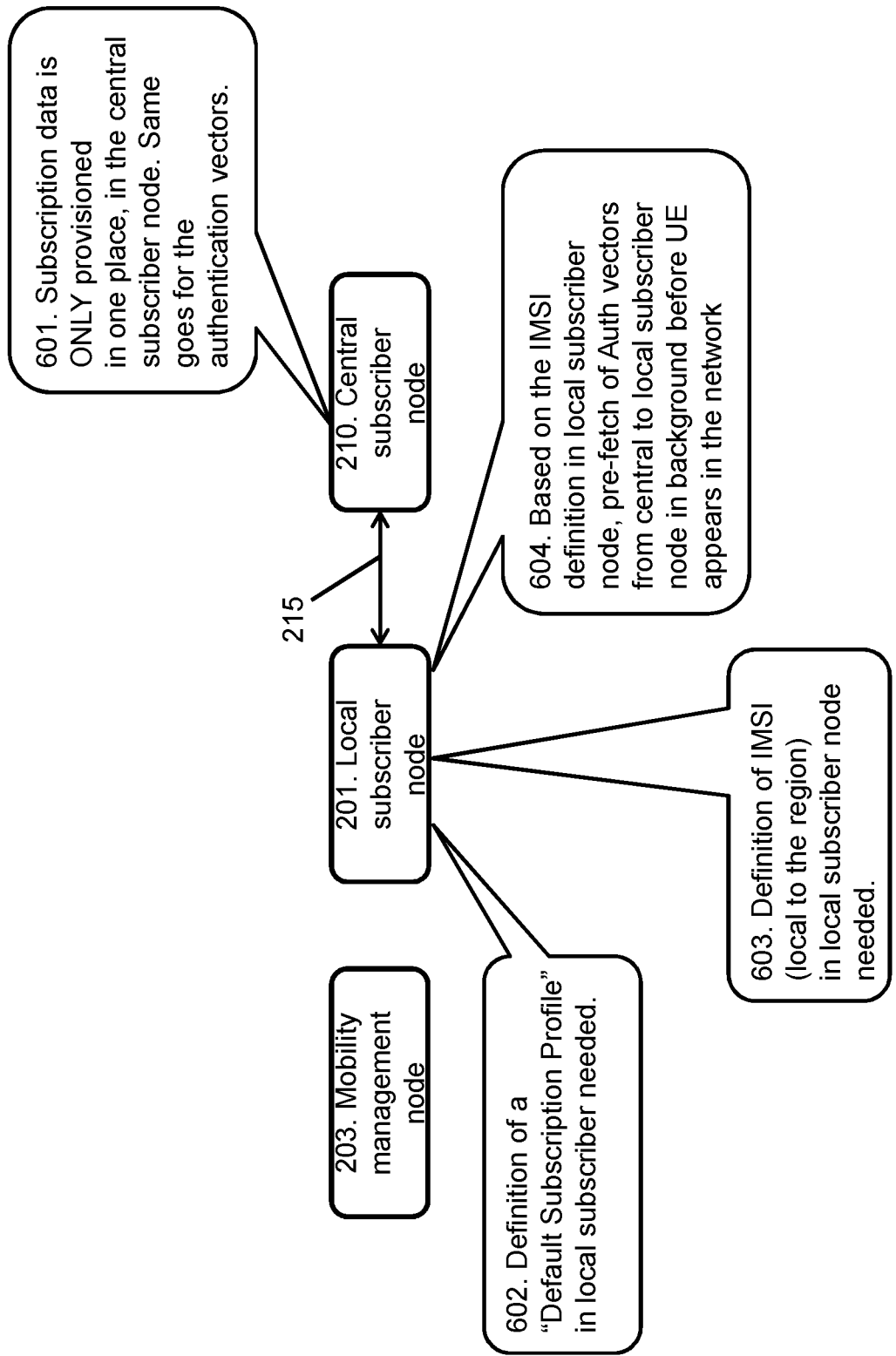
FIG. 6 is a schematic block diagram illustrating embodiments of a method.

FIG. 6 is a block diagram illustrating subscription registration in the central subscriber node 210, and corresponds to steps 401-402 in FIG. 4.

Step 601

The subscription data is only provisioned in one place, in the central subscriber node 210. Same goes for the authentication vectors.

Step 602

A "Default Subscription Profile" is defined in the local subscriber node 201. The term default subscription profile is another term for the default subscription data, i.e. the terms default subscription profile and default subscription data are used interchangeably herein. When the default subscription profile is defined in the local subscriber node 201 it is provisioned or stored in the local subscriber node 201. This default subscription profile may be replaced by another subscription profile that is received from the central subscriber node 210.

Step 603

The IMSI (local to the region) is defined in local subscriber node 201. The IMSI is associated with the UE 205 that sends the request. The IMSI being local to the region means that the associated UE 205 or subscriber is served by the local subscriber node 201.

Step 604

Based on the IMSI definition in the local subscriber node 201, the local subscriber node 201 pre-fetches authentication data from the central subscriber node 210 to the local subscriber node 201 in background before the UE 205 appears in the whole network that serves the UE 205, including the mobility management node 203 and the subscriber node. The authentication data may be in the form of authentication vectors.

Figure 7:
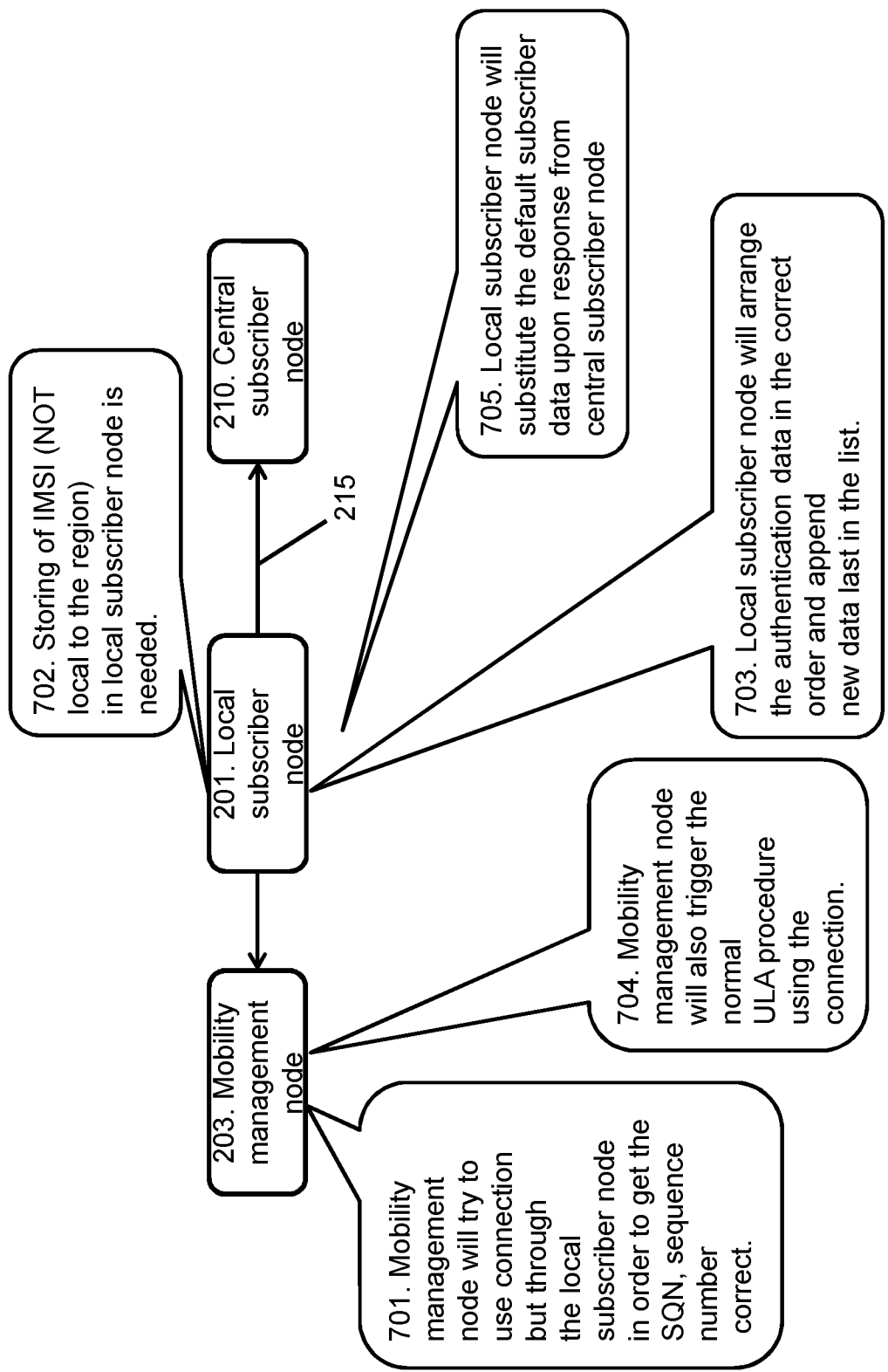
FIG. 7 is a schematic block diagram illustrating embodiments of a method.

FIG. 7 illustrates the UEs 205 initial attach to the local network 205, i.e. the local mobility management node 203. The steps in FIG. 7 correspond to steps 403-407 in FIG. 4.

Step 701

The mobility management node 203 will try to use the connection 215 (e.g. the S6a connection 215), but goes through the local subscriber node 201 instead in order to get the correct sequence number (SQN).

Step 702

The local subscriber node 201 stores the IMSI for the UE 205 (NOT local to the region). There is only one ISMI for a subscriber. Here, non-local IMSI means that for the subscriber that has to be served by the central subscriber node 210, the local subscriber node 201 must store the subscriber data including the IMSI.

Step 703

The local subscriber node may arrange the authentication data in a certain order and append new data last in the list. In case the authentication data is in the form of authentication vectors, the authentication vectors may be arranged in a certain order and the new data is appended last in the list.

Step 704

Mobility management node may also trigger the normal Update Location Answer (ULA) message using the connection 215. The normal ULA message is a message sent from the subscriber node or subscriber server to the mobility management node 203, or from the central subscriber node 210 to the local subscriber node 201.

Step 705

The local subscriber node 201 may substitute the default subscriber data upon response from the central subscriber node 210.

The Insert Subscriber Data Request (IDR) will trigger the local subscriber node 201 to update the sub data (the sub data refers to the unique subscriber data). The Cancel Location Request (CLR) message will not trigger the local subscriber node 201 to remove the sub data.

Figure 8:
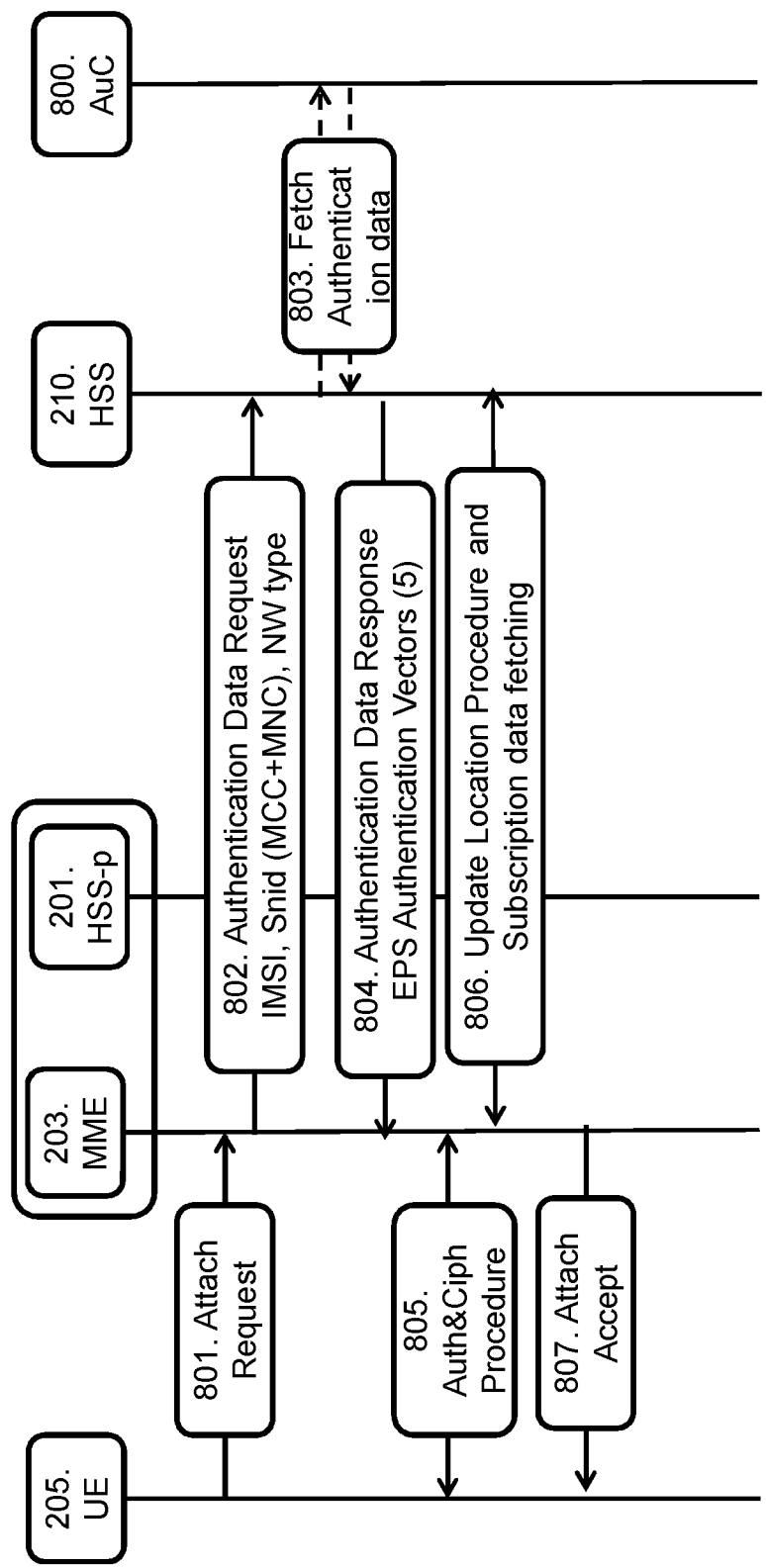
FIG. 8 is a signaling diagram illustrating embodiments of a method.

FIG. 8 is a signaling diagram illustrating embodiments of a method. In FIG. 8, the mobility management node 203 is exemplified with a MME, the local subscriber node 201 is exemplified with a HSS-p and the central subscriber node 210 is exemplified with a HSS. In addition, an Authentication center (AuC) 800 is also illustrated in FIG. 8. An AuC 800 is a node which is sued for authentication of the UE 205. The authentication maybe done by identification and verification of an ID associated with the UE 205, e.g. SIM. The AuC 800 is responsible for the generation of the parameters used for the privacy and the ciphering of the radio link. The box covering both the MME 203 and the HSS-p 201 indicates that these two nodes may be co-located or that they may be separate standalone nodes connected to each other.

The method shown in FIG. 8 comprises at least some of the following steps, which steps may be performed in any suitable order than described below:

Step 801

This step corresponds to step 403 in FIG. 4. The UE 205 sends an Attach Request message to the MME 203. The MME 203 receives the Attach Request message from the MME 203.

Step 802

This step corresponds to step 404 in FIG. 4. The MME 203 sends an Authentication Data Request message intended to the HSS 210. However, since the connection 215 is inaccessible, it is instead the HSS-p 201 which receives the Authentication Data Request message from the MME 203. The MME 203 is not aware of that it is the HSS-p 201 that receives the request instead of the HSS 210. The Authentication Data Request message comprises one or more parameters associated with the requesting UE. Examples of such parameters are IMSI, Serving Network Identity (SNid) and Network (NW) type. The SNid may comprise Mobile Country Code (MCC) and Mobile Network Code (MNC)).

In case the connection 215 is accessible, the HSS 210 is the node which receives the Authentication Data Request message from the MME 203 instead of the HSS-p 201.

Step 803

This step corresponds to step 401 and 412 in FIG. 4. This step is illustrated with dotted arrows to indicate that is a step which is only performed when the connection 215 is accessible. When the connection 215 is accessible the HSS 210 fetches authentication data from the AuC 800.

Step 804

When the connection 215 is inaccessible, the HSS-p 201 sends an Authentication Data Response message to the MME 203 as a response to the request in step 802. The MME 203 receives the Authentication Data Response message from the HSS-p 201. The response message comprises the requested authentication data. The authentication data may be in the form of EPS Authentication Vectors, and there may be for example 5 such vectors.

When the connection 215 is accessible, it is the HSS 210 which sends the Authentication Data Response message to the MME 203 instead of the HSS-p 201. The MME 203 receives the Authentication Data Response message from the HSS 210 when the connection 215 is accessible.

Step 805

An authentication and ciphering procedure may take place between the UE 205 and the MME 203.

Step 806

An update Location Procedure and Subscription data fetching takes place between the MME 203 and the HSS-p 201 when the connection 215 is inaccessible, and between the MME 203 and the HSS 210 when the connection 215 is accessible.

Step 807

This step corresponds to step 407 and step 415 in FIG. 4. The MME 203 sends an attach accept message to the UE 205. The UE 205 receives the attach accept message from the MME 203. The attach accept message is a response to the attach request message in step 801.

The subscription data is only provisioned in one place, in the HSS 210. Same goes for the Authentication vectors. The HSS-p 2012 will hold a default EPS Subscriber data common for all UE to be used when/if S6a communication 215 fails.

Figure 9:
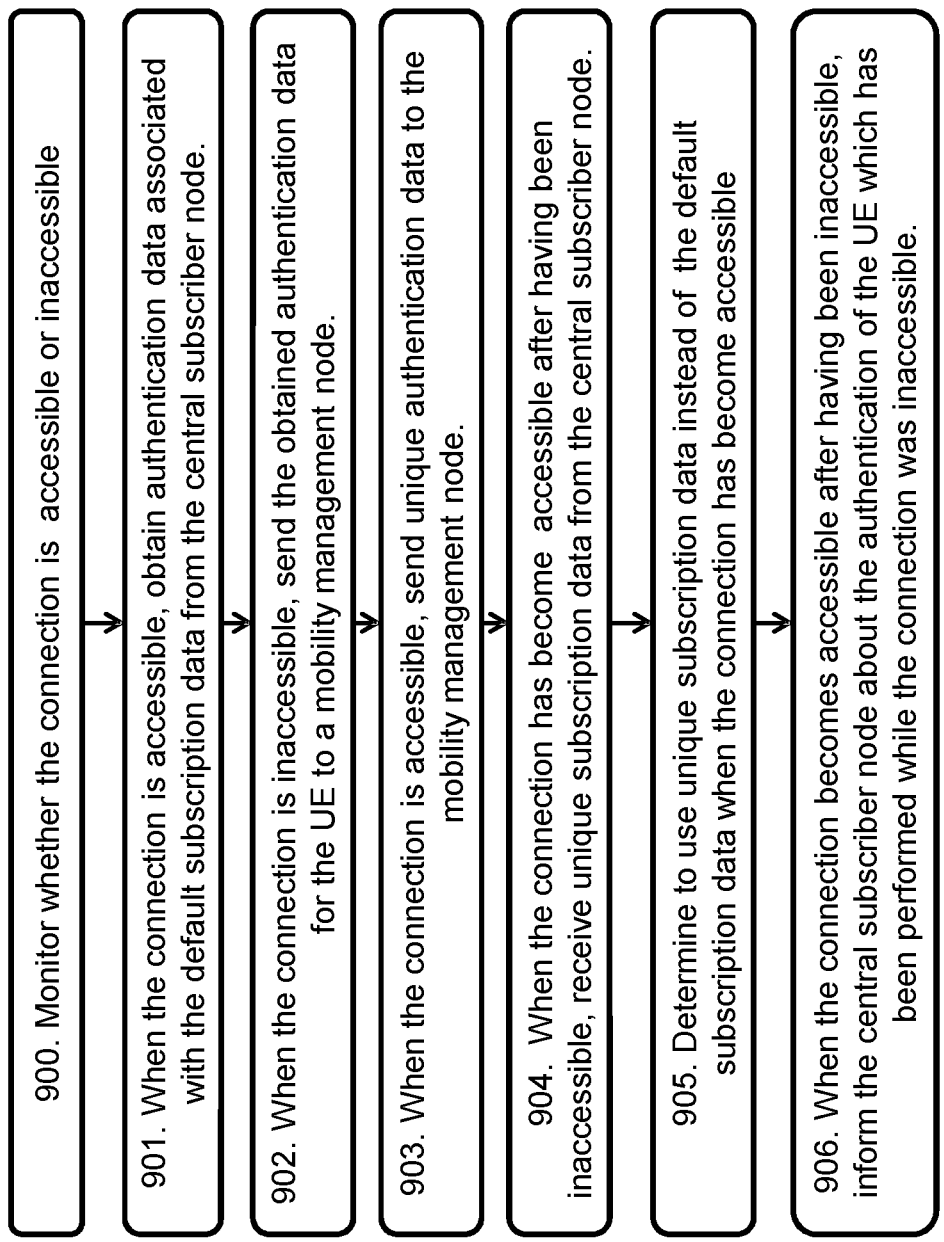
FIG. 9 is a flow chart illustrating embodiments of a method.

The method described above will now be described seen from the perspective of the local subscriber node 201. FIG. 9 is a flowchart describing the present method performed by the local subscriber node 201 for handling attachment of a UE 205 to a central network 200a. The local subscriber node 201 comprises default subscription data which is common for all UEs 210 which are associated with a local network 200b. The UE 205 may be configured in the local subscriber node 201.

The local subscriber node 201 may be a standalone node, or co-located with a mobility management node, or co-located with an Authentication, Authorization, and Accounting (AAA) node. The local subscriber node 201 may be a local subscriber function which is a standalone function, or a function which is co-located with a Mobility Management (MM) Control Function, or a function which is co-located with the Authentication Function. The local subscriber node 201 may be a pHSS node, or a pHSS function, or an AAA node or an AAA function.

AAA may be a Diameter or RADIUS based protocol. The AAA is responsible for authentication, authorization and accounting related to UEs 205. An AAA node may be an AAA server, an AAA proxy etc.

The method in FIG. 9 comprises at least some of the following steps to be performed by the local subscriber node 201, which steps may be performed in any suitable order than described below:

Step 900

This step corresponds to step 400 in FIG. 4. The local subscriber node 201 may monitor whether the connection 215 to the central subscriber node 210 is accessible or inaccessible. This step may be performed continuously throughout the whole method illustrated in figure, it may be performed at regular intervals or it may be performed when triggered. The monitoring may be done e.g. by using a ping function which is adapted to test reachability. If a ping function indicates that the central subscriber node 210 is not reachable, it implies that the connection 215 is inaccessible. A ping function may involves ending an echo request message, A ping response message may be received if the connection 215 is accessible, and the connection 215 is inaccessible if no ping response message is received in reply to the echo request message.

Step 901

This step corresponds to steps 401 and 402 in FIG. 4 and step 604 in FIG. 6. When a connection 215 to a central subscriber node 210 is accessible, the local subscriber node 201 obtains authentication data associated with the default subscription data from the central subscriber node 210.

The authentication data may be obtained before a UE 205 appears in the local network 200a for the second or more times.

The authentication data obtained from the central subscriber node 210 may be appended at an end of a list of existing authentication data comprised in the local subscriber node 201.

Step 902

This step corresponds to step 405 in FIG. 4 and step 804 in FIG. 8. When the UE 205 requests attachment to a central network 200a when the connection 215 to the central subscriber node 210 is inaccessible, the local subscriber node sends the obtained authentication data for the UE 205 to a mobility management node 203.

Step 903

This step corresponds to step 413 in FIG. 4. When the UE 205 requests attachment to the central network 200a when the connection 215 to the central subscriber node 210 is accessible, the local subscriber node 201 may send unique authentication data to the mobility management node 203. The unique authentication data is based on unique subscription data which is unique to the UE 205.

Step 904

This step corresponds to step 408 in FIG. 4. When the connection 215 to the central subscriber node 210 has become accessible after having been inaccessible, the local subscriber node 201 may receive unique subscription data from the central subscriber node 210.

Step 905

This step corresponds to step 409 in FIG. 4. The local subscriber node 201 may determine to use unique subscription data instead of the default subscription data when the connection 215 has become accessible.

Step 906

This step corresponds to step 410 in FIG. 4. When the connection 215 to the central subscriber node 210 becomes accessible after having been inaccessible, the local subscriber node 201 may inform the central subscriber node 210 about the authentication of the UE 205 which has been performed while the connection 215 was inaccessible. The local subscriber node 201 may inform the central subscriber node 210 by sending a flag, where the value 1 of the flag indicates that the UE 205 has been authentication and the value 0 indicates that the UE 205 has not been authenticated.

The local subscriber node 201 may periodically try to reach the central subscriber node 120 to monitor the connection 215 status. If the local subscriber node 201 has performed authentication of a subscriber while the connection 215 has been inaccessible, then the local subscriber node 201 may update the central subscriber node 210 without any UE 205 interaction.

Figure 10:
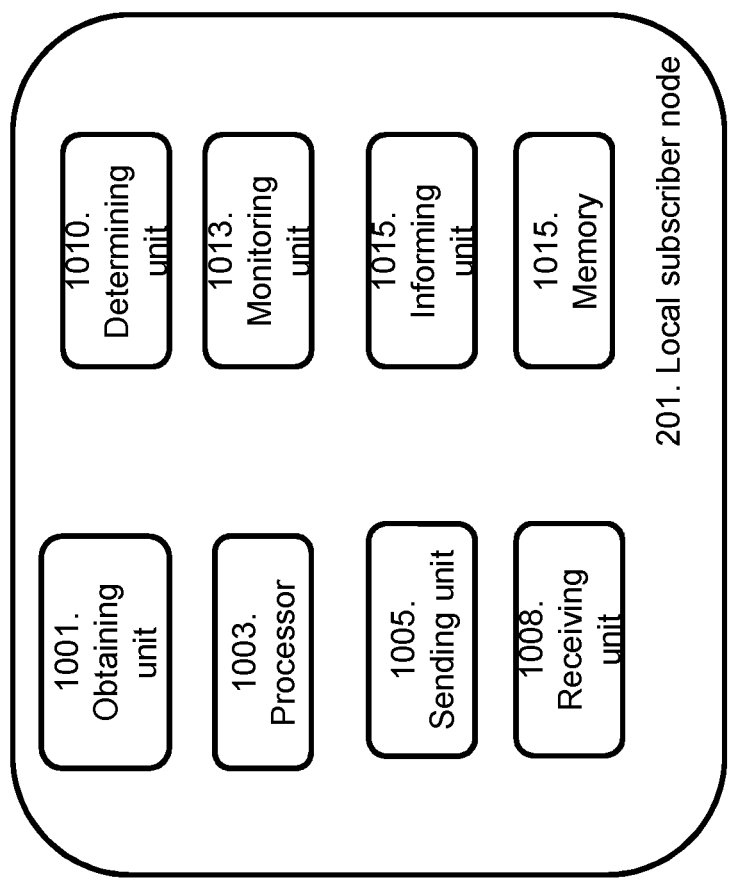
FIG. 10 is a schematic block diagram illustrating embodiments of a local subscriber node.

To perform at least some of the method steps shown in FIGS. 4-9 for handling attachment of a UE 205 to a central network 200a, the local subscriber node 201 may comprise an arrangement as shown in FIG. 10. As mentioned earlier, the local subscriber node 201 comprises default subscription data which is common for all UEs 205 which is associated with a local network 200b. The UE 205 may be configured in the local subscriber node 201. The local subscriber node 201 may be a standalone node, or co-located with a mobility management node, or co-located with an AAA node. The local subscriber node 201 may be a pHSS, or a pHSS function, or an AAA node or an AAA function.

To perform at least some of the method steps shown in FIGS. 4-9 for handling attachment of a UE 205 to a central network 200a, the local subscriber node 201 is adapted to, e.g. by means of a obtaining unit 1001, obtain authentication data associated with the default subscription data from the central subscriber node 210 when a connection 215 to a central subscriber node 210 is accessible. The authentication data may be obtained before a UE 205 appears in the local network 200a for the second or more times. The authentication data obtained from the central subscriber node 210 may be appended at an end of a list of existing authentication data. The obtaining unit 1001 may also be referred to as an obtaining module, an obtaining means, an obtaining circuit, means for obtaining etc. The obtaining unit 1001 may be a processor 1003 of the local subscriber node 201.

The local subscriber node 201 is adapted to, e.g. by means of a sending unit 1005, send the obtained authentication data for the UE 205 to a mobility management node 203 when the UE 205 requests attachment to the central network 200a when the connection 215 to the central subscriber node 210 is inaccessible. The sending unit 1005 may be referred to as a transmitting unit. The sending unit 1005 may also be referred to as a sending module, a sending means, a sending circuit, means for sending, output unit etc. The sending unit 1005 may be a transmitter, a transceiver etc. The sending unit 1005 may be a wireless transmitter of the local subscriber node 201 of a wireless or fixed communications system.

The local subscriber node 201 may be further adapted to, e.g. by means of the sending unit 1005 send unique authentication data to the mobility management node 203 when the UE 205 requests attachment to the central network 200a when the connection 215 to the central subscriber node 210 is accessible. The unique authentication data is based on unique subscription data which is unique to the UE 205.

The local subscriber node 201 may be further adapted to, e.g. by means of a receiving unit 1008, receive unique subscription data from the central subscriber node 210 when the connection 215 to the central subscriber node 210 has become accessible after having been inaccessible. The receiving unit 1008 may also be referred to as a receiving module, a receiving means, a receiving circuit, means for receiving, input unit etc. The receiving unit 1008 may be a receiver, a transceiver etc. The receiving unit 1008 may be a wireless receiver of the local subscriber node 201 of a wireless or fixed communications system.

The local subscriber node 201 may be further adapted to, e.g. by means of a determining unit 1010, determine to use the unique subscription data instead of the default subscription data when the connection 215 has become accessible. The determining unit 1010 may also be referred to as a determining module, a determining means, a determining circuit, means for determining etc. The determining unit 1010 may be the processor 1003 of the local subscriber node 201.

The local subscriber node 201 may be further adapted to, e.g. by means of a monitoring unit 1013, monitor whether the connection 215 to the central subscriber node 210 is accessible or inaccessible. The monitoring unit 1013 may also be referred to as a monitoring module, a monitoring means, a monitoring circuit, means for monitoring etc. The monitoring unit 1013 may be the processor 1003 of the local subscriber node 201.

The local subscriber node 201 may be further adapted to, e.g. by means of an informing unit 1015, when the connection 215 to the central subscriber node 210 becomes accessible after having been inaccessible, inform the central subscriber node 210 about the authentication of the UE 205 which has been performed while the connection 215 was inaccessible. The informing unit 1015 may be the sending unit 1005. The informing unit 1015 may also be referred to as an informing module, an informing means, an informing circuit, means for informing etc. The informing unit 1015 may be the processor 1003 of the local subscriber node 201.

The local subscriber node 201 may further comprise a memory 1015 or it may be adapted to be connected to a memory 105 comprising one or more memory units. The memory 1015 is arranged to be used to store data, received data streams, power level measurements, default subscription data, unique subscription data, authentication data, information indicating accessible or inaccessible status of the connection 215, monitoring information, threshold values, time periods, configurations, schedulings, and applications to perform the methods herein when being executed in the local subscription node 201. The memory 1015 may comprise instructions executable by the processor 1003.

The present mechanism for handling attachment of a UE 205 to a central network 200a may be implemented through one or more processors, such as a processor 1003 in the arrangement depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or microprocessor or microcontroller. The program code mentioned above may also be provided as a computer program product, for instance in the form of a data carrier carrying computer program code for performing the embodiments herein when being loaded into the local subscriber node 201. One such carrier may be in the form of a CD ROM disc. It is however feasible with other data carriers such as a memory stick. The computer program code can furthermore be provided as pure program code on a server and downloaded to the local subscriber node 201.

Those skilled in the art will also appreciate that the obtaining unit 1001, the sending unit 1005, the receiving unit 1008, the determining unit 1010, the monitoring unit 1013 and the informing unit 1015 described above may refer to a combination of analog and digital circuits, and/or one or more processors configured with software and/or firmware, e.g. stored in a memory, that when executed by the one or more processors such as the processor 1003 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a computer program may comprise instructions which, when executed on at least one processor, e.g. the processor 1003, cause the at least one processor to carry out at least some of the method steps in FIGS. 4-9. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a local subscriber node for handling attachment of a User Equipment (UE) to a central network, wherein the local subscriber node comprises default subscription data which is common for all UEs which are associated with a local network, the method comprising:
when a connection to a central subscriber node is accessible, obtaining authentication data associated with the default subscription data from the central subscriber node;
when the UE requests attachment to the central network when the connection to the central subscriber node is inaccessible, sending the obtained authentication data for the UE to a mobility management node.

2. The method according to claim 1, further comprising;
when the UE requests attachment to the central network when the connection to the central subscriber node is accessible, sending unique authentication data to the mobility management node, which unique authentication data is based on unique subscription data which is unique to the UE.

3. The method according to claim 1, wherein the authentication data is obtained before the UE appears in the local network for the second or more times.

4. The method according to claim 1, further comprising:
when the connection to the central subscriber node has become accessible after having been inaccessible, receiving unique subscription data from the central subscriber node; and
determining to use unique subscription data instead of the default subscription data when the connection has become accessible.

5. The method according to claim 1, wherein the authentication data obtained from the central subscriber node is appended at an end of a list of existing authentication data.

6. The method according to claim 1, further comprising:
monitoring whether the connection to the central subscriber node is accessible or inaccessible.

7. The method according to claim 1, wherein the UE is configured in the local subscriber node.

8. The method according to claim 1, further comprising:
when the connection to the central subscriber node becomes accessible after having been inaccessible, informing the central subscriber node about the authentication of the UE which has been performed while the connection was inaccessible.

9. The method according to claim 1, wherein the local subscriber node is a standalone node, or co-located with a mobility management node, or co-located with an Authentication, Authorization, and Accounting (AAA) node.

10. The method according to claim 1, wherein the local subscriber node is local subscriber function which is a standalone function, or a function which is co-located with a Mobility Management (MM) Control Function, or a function which is co-located with the Authentication Function.

11. The method according to claim 1, wherein the local subscriber node is a proxy Home Subscriber Server (pHSS) or a proxy Home Subscriber Server function, or an Authentication, Authorization, and Accounting (AAA) node, or an AAA function.

12. A local subscriber node for handling attachment of a User Equipment (UE) to a central network, wherein the local subscriber node comprises default subscription data which is common for all UEs which is associated with a local network, the local subscriber node configured to:
when a connection to a central subscriber node is accessible, obtain authentication data associated with the default subscription data from the central subscriber node; and to when the UE requests attachment to the central network when the connection to the central subscriber node is inaccessible, send the obtained authentication data for the UE to a mobility management node.

13. The local subscriber node according to claim 12, configured to:
when the UE requests attachment to the central network when the connection to the central subscriber node is accessible, send unique authentication data to the mobility management node, which unique authentication data is based on unique subscription data which is unique to the UE.

14. The local subscriber node according to claim 12, wherein the authentication data is obtained before the UE appears in the local network for the second or more times.

15. The local subscriber node according to claim 12, configured to:
when the connection to the central subscriber node has become accessible after having been inaccessible, receive unique subscription data from the central subscriber node; and
determining to use the unique subscription data instead of the default subscription data when the connection has become accessible.

16. The local subscriber node according to claim 12, wherein the authentication data obtained from the central subscriber node is appended at an end of a list of existing authentication data.

17. The local subscriber node according to claim 12, configured to:
monitor whether the connection to the central subscriber node is accessible or inaccessible.

18. The local subscriber node according to claim 12, wherein the UE is configured in the local subscriber node.

19. The local subscriber node according to claim 12, configured to:
when the connection to the central subscriber node becomes accessible after having been inaccessible, inform the central subscriber node about the authentication of the UE which has been performed while the connection was inaccessible.

20. The local subscriber node according to claim 12, wherein the local subscriber node is a standalone node, or co-located with a mobility management node, or co-located with an Authentication, Authorization, and Accounting (AAA) node.

21. The local subscriber node according to claim 12, wherein the local subscriber node is local subscriber function which is a standalone function, or a function which is co-located with a Mobility Management (MM) Control Function, or a function which is co-located with the Authentication Function.

22. The local subscriber node according to claim 12, wherein the local subscriber node is a proxy Home Subscriber Server (pHSS) or a pHSS function, or an Authentication, Authorization, and Accounting (AAA) node, or an AAA function.

23. A computer program product comprised on a non-transitory computer readable medium of a local subscriber node configured to handle attachment of a User Equipment (UE) to a central network, the computer program product comprising instructions which, when executed on at least one processor, cause the at least one processor to:
when a connection to a central subscriber node is accessible, obtain authentication data associated with default subscription data from the central subscriber node, wherein the local subscriber node comprises the default subscription data which is common for all UEs which are associated with a local network;
when the UE requests attachment to the central network when the connection to the central subscriber node is inaccessible, send the obtained authentication data for the UE to a mobility management node.

* * * * *